US009123017B2

(12) United States Patent
Rayes et al.

(10) Patent No.: US 9,123,017 B2
(45) Date of Patent: Sep. 1, 2015

(54) SYSTEMS AND METHODS FOR NETWORK INVENTORY MANAGEMENT UTILIZING MOBILE TECHNOLOGY

(71) Applicant: Cisco Technology, Inc., San Jose, CA (US)

(72) Inventors: Ammar Rayes, San Ramon, CA (US); Sanjeev Ukhalkar, Fremont, CA (US); Anil Vasireddy, Santa Clara, CA (US); David F. Hinnant, Wake Forest, NC (US)

(73) Assignee: Cisco Technology, Inc., San Jose, CA (US)

(*) Notice: Subject to any disclaimer, the term of this patent is extended or adjusted under 35 U.S.C. 154(b) by 24 days.

(21) Appl. No.: 14/053,027

(22) Filed: Oct. 14, 2013

(65) Prior Publication Data
US 2014/0089148 A1 Mar. 27, 2014

Related U.S. Application Data

(63) Continuation of application No. 13/481,184, filed on May 25, 2012, now Pat. No. 8,584,942.

(51) Int. Cl.
G06Q 30/00 (2012.01)
G06Q 10/08 (2012.01)
G06K 19/00 (2006.01)
G06K 19/06 (2006.01)
H04L 12/24 (2006.01)

(52) U.S. Cl.
CPC .............. *G06Q 10/087* (2013.01); *G06K 19/00* (2013.01); *G06K 19/06028* (2013.01); *H04L 41/0856* (2013.01)

(58) Field of Classification Search
CPC ..... G06Q 10/087; G06Q 10/00; G06Q 10/08; G06Q 10/0875; G06Q 30/04; G06Q 20/20; G06Q 20/3274; G06Q 20/3276; G06Q 20/36; G06Q 20/387; G06Q 30/0251; G06Q 30/06; G06Q 30/0633; G06Q 50/06; G06K 19/06046; G06K 7/10702; G06K 7/10881; G06K 5/00; G06K 17/00; G06K 2017/0051
USPC ........ 235/385, 375, 380, 383, 462.01, 472.01
See application file for complete search history.

(56) References Cited

U.S. PATENT DOCUMENTS 6,366,771 B1 4/2002 Angle et al.
7,823,778 B1 11/2010 Singh et al.
(Continued)

FOREIGN PATENT DOCUMENTS

EP 0 930 766 A2 7/1999

OTHER PUBLICATIONS

International Search Report in counterpart International Application No. PCT/US2013/041519, mailed Sep. 23, 2013, 2 pages.
(Continued)

*Primary Examiner* — Thien M Le

(57) ABSTRACT

A system for streamlining a network management system (NMS) includes scanning, via a mobile device, a code on a hardware or software component; and determining, via the mobile device, whether the hardware or software component is a network component (NC), based on the scanned code. The hardware or software component may be a call manager, server, client device, interface card, repeater, hub, bridge, switch, router, or firewall, for example.

18 Claims, 5 Drawing Sheets

(56) References Cited

U.S. PATENT DOCUMENTS

| | | |
|---|---|---|
| 2001/0054005 A1 | 12/2001 | Hook et al. |
| 2003/0093521 A1* | 5/2003 | Schlonski et al. ............ 709/224 |
| 2008/0000891 A1 | 1/2008 | Burr et al. |
| 2008/0208897 A1 | 8/2008 | Lew et al. |
| 2011/0055172 A1 | 3/2011 | Tan et al. |
| 2011/0058202 A1 | 3/2011 | St. Jacques, Jr. et al. |
| 2011/0163850 A1* | 7/2011 | Bachman et al. ............ 340/10.1 |
| 2011/0290876 A1 | 12/2011 | Graves et al. |
| 2012/0271712 A1 | 10/2012 | Katzin et al. |
| 2013/0046884 A1* | 2/2013 | Frost et al. .................... 709/224 |
| 2013/0297462 A1* | 11/2013 | Ottley ............................ 705/28 |

OTHER PUBLICATIONS

International Preliminary Report in counterpart International Application No. PCT/US2013/041519, issued Nov. 25, 2014, 8 pages.

* cited by examiner

SYSTEMS AND METHODS FOR NETWORK INVENTORY MANAGEMENT UTILIZING MOBILE TECHNOLOGY

CROSS-REFERENCE TO RELATED APPLICATIONS

This is a continuation of application Ser. No. 13/481,184 filed on May 25, 2012, the contents of all of which are hereby incorporated herein by reference in their entirety.

TECHNICAL FIELD

The present disclosure relates generally to network inventory management.

BACKGROUND

A network management system ("NMS") is a combination of hardware and software used to monitor and administer a computer network. An NMS manages network components ("NCs") of a network (which can include hardware, firmware, and/or software components) and the channels used to communicate among the components and between the components and the outside world. Typical aspects of an NMS include faults, configuration, accounting, performance, and security management. Tasks of an NMS may include, for example, discovering network inventory, monitoring device health and status, providing alerts to conditions that influence system performance, and identification of problems, their source(s), and possible solutions.

Network inventory discovery involves identifying one or more NCs in a network. Once the NCs are discovered, the NMS can provide management services and applications related to the NCs to users and administrators of the network. One existing approach to discovering network inventory is through manually entering NCs. This process can be time consuming.

DESCRIPTION OF EXAMPLE EMBODIMENTS

Overview

Figure 1:
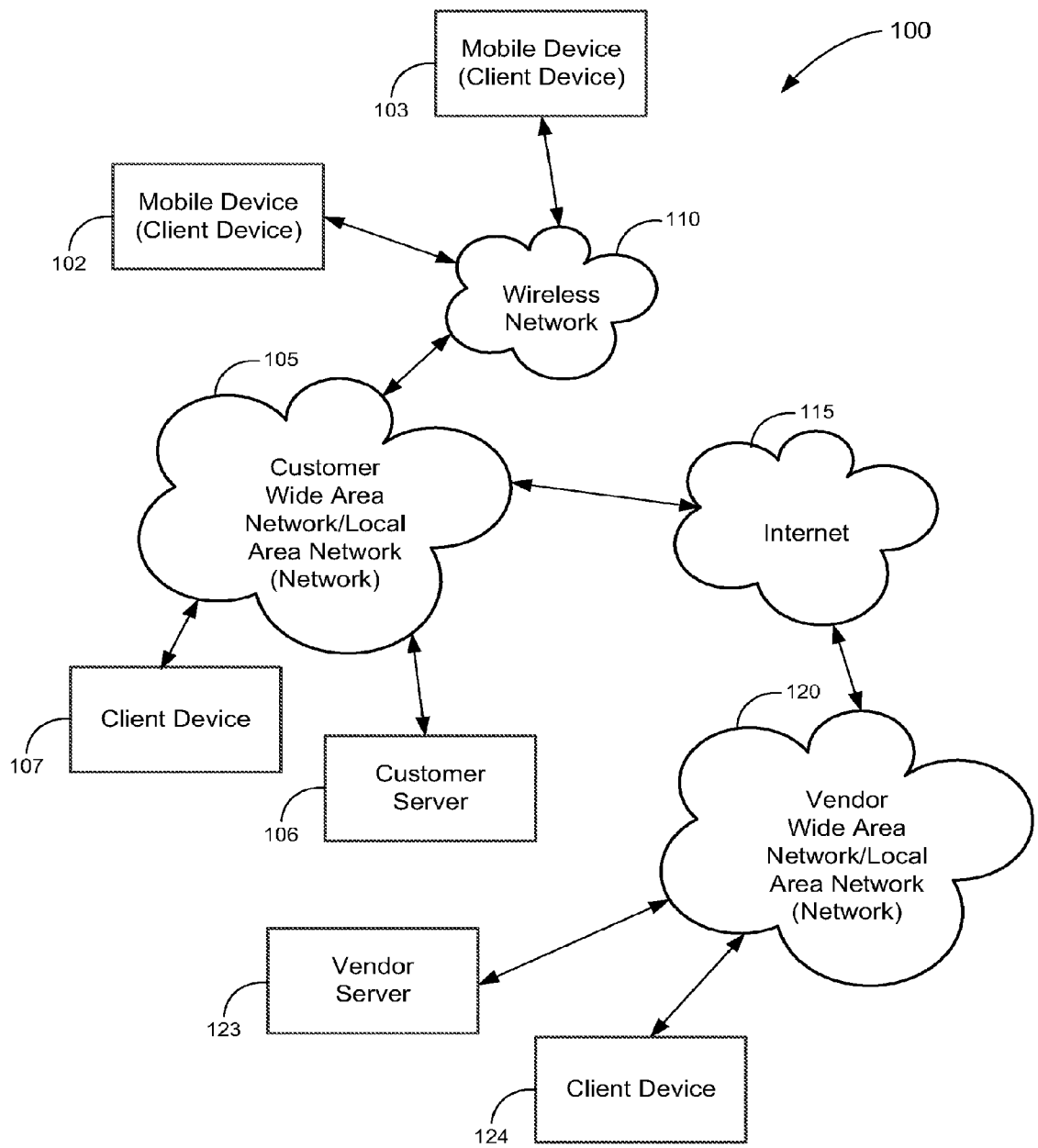
FIG. 1 illustrates a block diagram of an example NMS.

In one embodiment, a method for streamlining network inventory management includes scanning, via a mobile device, a code on a component, such as a hardware or software component; and determining, via the mobile device, whether the hardware or software component is a network component (NC) of a particular network, based on the scanned code. The component maybe a call manager, server, client device, interface card, repeater, hub, bridge, switch, router, or firewall, for example.

The method may further include assigning the component to a network (therefore becoming a NC), via the mobile device, where the hardware or software component is not a NC of the particular network. The assigning may include identifying the component as a network component of the particular network via the scanned code, and the scanned code may logically link the component to the particular network. Because the NC may be identified using a mobile device, a GPS component of the mobile device may trace location of the NC.

Also, the method may include requesting and assigning operational parameters or characteristics of the NC, via the mobile device. The operational parameters or characteristics may include upload and download rates, bandwidth, power consumption, or buffer size, for example.

Furthermore, the method may include communicating the operational parameters or characteristics to a secured private network via a secured channel. The secured private network may be a private cloud infrastructure.

Example Embodiments

Various embodiments described herein can be used alone or in combination with one another. The following detailed description describes only a few of the many possible implementations of the present embodiments. For this reason, this detailed description is intended by way of illustration, and not by way of limitation.

Advances in network management system (NMS) technologies have provided solutions to allow network administrators to manage networks through electronic workstations and mobile devices. However, there is room for advancements in the task of discovering and managing network components (NCs). Described herein is a network management system (NMS) for improving discovery and management of NCs, utilizing advancements in mobile devices, bar code or serial number scanning, and network infrastructures. Particularly, in certain exemplary embodiments, the NMS may utilize matrix bar code technologies and cloud computing to streamline network inventory management.

For example, utilizing the NMS, a mobile device, such as a smart phone, can scan a matrix bar code on a hardware or software component and then determine whether the component is a NC or not. Where the component is not a NC, the mobile device can assign the component to a network using the matrix bar code as an identifier. Once assigned through such a process or another process of assigning a hardware or software component to a network, the component is considered an NC of the network to which it is assigned and is identifiable via a mobile device via matrix bar code scanning as well. With respect to assigning a component to a network, such assigning can be made by associating a component identification code with a network identification code.

A hardware or software component may also be identifiable by a product identification code, a serial number, IP address, or the like. Further, because a NC is identified using a mobile device in certain exemplary embodiments, location of the NC can be tracked via a geographic location mechanism, such as a global positioning system (GPS) component of the mobile device. Because the mobile device can readily identify NCs using its unique identifier, the mobile device is able to request operational parameters or characteristics of a NC or submit operational parameters or characteristics of a NC to a storage device of the NMS, for example. Operational parameters or characteristics may include upload and download rates, bandwidth, power consumption, buffer size, for example. Also, the NMS can provide security and further streamline network inventory management by storing the identifier and operational parameters and characteristics of a NC in a storage device of a secured and private storage system, such as a cloud infrastructure storage system. A NC may include any single network node or group of network nodes. A NC may also be any hardware, software, or firmware network node, including call managers, interface cards, repeaters and hubs, bridges, switches, routers, firewalls, for example.

FIG. 1 illustrates a block diagram of an example NMS 100. As shown, FIG. 1, for example, includes a variety of networks, such as a first local area network (LAN)/wide area network (WAN) 105 (e.g., a customer LAN/WAN) and wireless network 110, a variety of devices, such as client device 107 and mobile devices 102 and 103, and a variety of servers, such as first server 106 (e.g., a customer server). Further the system of networks 100 includes an intermediary network, such as the Internet 115, that connects the first LAN/WAN 105 to a second LAN/WAN 120 (e.g., a vendor LAN/WAN) that also includes a variety of devices (e.g., client device 124) and servers (e.g., a second server 123 such as a vendor server). In certain exemplary embodiments, customers and partners of customers may only have access to the NMS 100 via devices of the first LAN/WAN 105 and the wireless network 110; whereas, a vendor(s) of the NMS may only have access to the NMS via devices of the second LAN/WAN 120. However, both the first LAN/WAN 105 and the second LAN/WAN 120 can share information and commands of the NMS 100 via the connections described herein. Although not depicted, the system of networks 100 may also include mass storage and other LANs or WANs or any other form of area networks such as a metropolitan area network (MAN), a storage area network (SAN).

The system of networks 100 may couple network components so that communications between such components can occur, whether communications are wire-line or wireless communications. Wire-line (such as a telephone line or coaxial cable) and wireless connections (such as a satellite link) can form channels that may include analog lines and digital lines. In communicating across such channels, the system of networks 100 may utilize various architectures and protocols and may operate with a larger system of networks. Various architectures may include any variety or combination of distributed computing architectures, including, a 2-tier architecture (client-server architecture), an N-tier architecture, a peer-to-peer architecture, a tightly-coupled architecture, a service-oriented architecture (e.g., a cloud computing infrastructure), a mobile-code-based architecture, a replicated-repository-based architecture, and so forth. Further, the various nodes of the system of networks 100 may provide configurations for differing architectures and protocols. For example, a router may provide a link between otherwise separate and independent LANs, and a network switch may connect two or more NCs or groups of NCs. Signaling formats or protocols employed may include, for example, TCP/IP, UDP, or the like.

With respect to a wireless network, such as the wireless network 110, such a network may include stand-alone ad-hoc, mesh, Wireless LAN (WLAN), or a cellular network. A wireless network, such as network 110 may further include a system of terminals, gateways, switches, routers, call managers, and firewalls coupled by wireless radio links. A wireless network may further employ a plurality of network access technologies, including Global System for Mobile Communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, or 802.11b/g/n.

Networks (e.g., 105, 110, and 120) and devices (e.g., 102, 103, 106, 107, 123, and 124) of the NMS 100 may be or include computational nodes of the NMS. For example, the aspects of the system of networks 100 can enable processing of different aspects of the NMS 100 on a plurality of processors located at one or more of the computational nodes. A computational node may be one or more of any electronic device that can perform computations, such as a general-purpose computer, a mainframe computer, a workstation, a desktop computer, a laptop computer, a mobile device, and so forth. Also, a computational node can include logic (e.g., client application logic 302, logic of the Internet 304, DMZ logic 306, and vendor service logic 310 depicted in FIG. 3). Logic may include or interact with a knowledge base, such as a database.

Computational nodes of the NMS 100 may communicate network management and inventory information and commands to a vendor services node(s) (e.g., the network 120), and vice versa. The vendor services node(s) may include the vendor service logic 310 described below. Other computational nodes, such as customer nodes and partner nodes, may include the client application logic 302 described below. One or more of the computational nodes of the NMS 100 may perform aspects of the method 400. Instructions for performing these aspects of the method 400 may exist in logic described herein.

Figure 2:
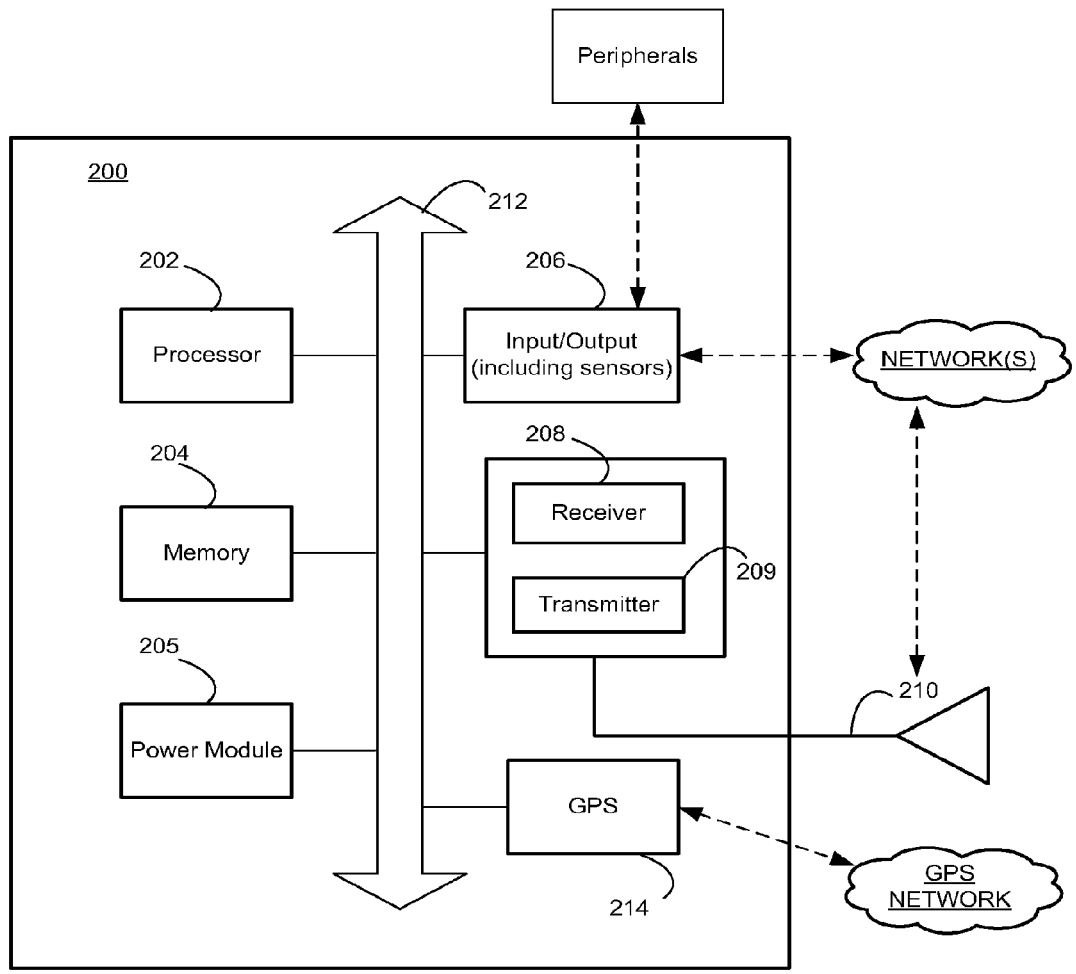
FIG. 2 illustrates a block diagram of an example electronic device that can implement a network inventory management aspect of an example NMS.

FIG. 2 illustrates a block diagram of an example electronic device 200 that can implement an aspect of an example NMS (e.g., the NMS 100). Instances of the electronic device 200 may be any client device or server of the system of networks 100 or any device capable of becoming a NC. The electronic device 200, which can be a combination of multiple electronic devices, may include a processor 202, memory 204, a power module 205, input/output 206 (including input/out signals, sensors, and internal, peripheral, user, and network interfaces), a receiver 208 and a transmitter 209 (or a transceiver), an antenna 210 for wireless communications, a global positioning system (GPS) component 214, and a communication bus 212 that connects the aforementioned elements of the electronic device 200. The processor 202 can be one or more of any type of processing device, such as a central processing unit (CPU). Also, for example, the processor 202 can be central processing logic; central processing logic includes hardware, firmware, software and/or combinations of each to perform a function(s) or an action(s), and/or to cause a function or action from another component. Also, based on a desired application or need, central processing logic may include a software controlled microprocessor, discrete logic such as an application specific integrated circuit (ASIC), a programmable/programmed logic device, memory device containing instructions, or the like, or combinational logic embodied in hardware. Also, logic may also be fully embodied as software. The memory 204, such as RAM or ROM, can be enabled by one or more of any type of memory device, such as a primary (directly accessible by the CPU) or a secondary (indirectly accessible by the CPU) storage device (e.g., flash memory, magnetic disk, optical disk). The power module 205 contains one or more power components, and facilitates supply and management of power to the electronic device 200. The input/output 206, can include any interface for facilitating communication between any components of the electronic device 200, components of external devices (such as components of other devices of the system of networks 100), and users. For example, such interfaces can include a network card that is an integration of the receiver 208, the transmitter 209, and one or more I/O interfaces. The network card, for example, can facilitate wired or wireless communication with other nodes of the system of networks 100. In cases of wireless communication, the antenna 210 can facilitate such communication. Also, the I/O interfaces, can include user interfaces such as monitors, displays, keyboards, keypads, touchscreens, microphones, and speakers. Further, some of the I/O interfaces and the bus 212 can facilitate communication between components of the electronic device, and in some embodiments ease processing performed by the processor 202. In other examples of the electronic device 200, one or more of the described components may be omitted.

Where the electronic device 200 is a client device, it can include a computing device capable of sending or receiving signals, such as via a wired or a wireless network. A client device may include, without limitation, a desktop computer or a portable device, such as a smart phone, a tablet computer, a laptop computer, a wearable computer, or an integrated device combining various features, such as features of the forgoing devices, or the like. Also, a client device may vary in terms of capabilities or features. For example, a smartphone or tablet computer device may include a physical or virtual keyboard, mass storage, an accelerometer, a gyroscope, a GPS, a digital camera, a touch sensitive color 2D or 3D display, or a combination thereof. Further, a client device may include or may execute a variety of operating systems, including a personal computer operating system, such as a Windows or Linux, or a mobile operating system, such as iOS or Android. A client device may also include or may execute a variety of possible communications applications, such as email, short message service (SMS), or multimedia message service (MMS). A client device may also include or execute a web browser that can perform a variety of possible tasks, such as browsing, searching, playing various forms of media.

Where the electronic device 200 is a server, it can include a computing device that is capable of sending or receiving signals, such as via a wired or wireless network, and may be capable of processing or storing signals. Thus, devices capable of operating as a server may include dedicated rack-mounted servers, desktop computers, laptop computers, set top boxes, integrated devices combining various features, such as one or more features of the foregoing devices, or the like. Further, a server may vary widely in configuration or capabilities, but generally, a server may include one or more central processing units and memory that make possible the execution of a server type operating system, such as Windows Server, Mac OS X, or UNIX, for example.

Figure 3:
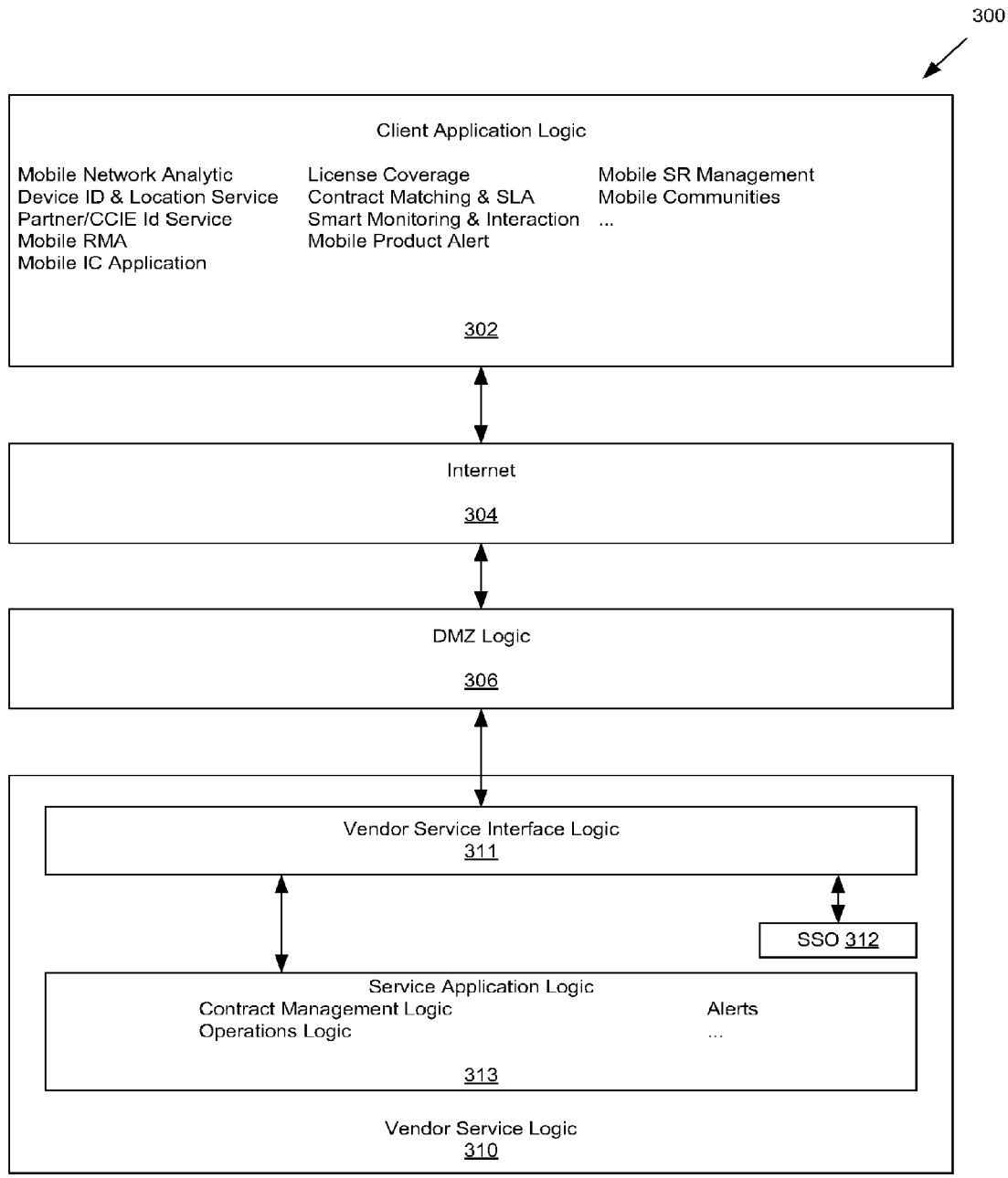
FIG. 3 illustrates a block diagram of an example logic architecture that can implement a network inventory management aspect of an example NMS.

FIG. 3 illustrates a block diagram of an example logic architecture 300 that can implement an aspect of an example NMS (e.g., the NMS 100). The logic architecture may include client application logic 302, logic of the Internet 304, DMZ logic 306, and vendor service logic 310 that includes vendor service interface logic 311, single sign-in (SSO) logic 312, and service application logic 313. In general, logic may be software, hardware, firmware, or a combination thereof.

The client application logic 302, which may be hosted by a client device of a customer, for example, may include application logic such as Mobile Network Analytic, License Coverage, Mobile Service Request (SR) Management, Device Identification and Location Service, Contract Matching and Service Level Agreement (SLA), Mobile Communities, Partner/Cisco Certified Internetwork Experts (CCIE) Identification Service, Smart Monitoring and Interaction, Mobile Return Merchandise/Material Authorization (RMA), Mobile Product Alert, and Mobile Intellectual Capital (IC) Application, for example.

Mobile Network Analytic may provide analysis of collected data that may produce an action. An action may include capturing a faulty software image/version and notifying network administrator to download a latest release of the software from a specific link, for example.

License Coverage may include software and hardware license compliance logic and information, service agreement logic and information, and alerts and automatic updates of software for licensed customers/devices, for example. Using device credentials in the form of a unique identifier, such as a validated serial number (SN) from a device identification service, License Coverage may also provide the latest license agreement for a company from which service was initiated. Also, License Coverage may access partner databases and may include standard APIs to integrate with various applications. As used herein the terms "serial number" and "SN" are used interchangeable with device credentials to describe a unique identifier of a device.

Mobile SR Management may include allowing authorized users to open new SRs, view and update SRs, and close SRs. Mobile SR Management may also include logic for monitoring and reporting on agreed performance indicators related to the compliance. Mobile SR Management may include service desk logic that can be mobile. The service desk logic may be responsible for acceptance, classification and handling of SRs regarding a mobile network and mobile technology. Further, Mobile SR Management allows a customer or engineer to use a smart phone to enter, update, or monitor the status of a SR. Mobile SR Management may require a user to register first. The customer or administrator at a customer site may enter a SR by scanning (or speaking or typing) a serial number/bar code of a device or NC. Mobile SR Management may also allow a user to attach (e.g., by taking a picture and attaching) the pertinent device specific data (e.g., data gathered by running "config" on a command line interface) of a device or NC. The pertinent data may then be encrypted and sent securely to a service provider's server, where an administrator can then take action with respect to the SR.

Device Identification and Location Service may include client device and server identification and authentication logic, device geographic location logic, such as GPS logic, and information regarding the location of a client device or server. Device Identification and Location Service may allow/entitle users to scan (or enter by voice or take a picture of the characters for optical character recognition where scanning is not feasible) device credentials (e.g. SN, product identification (PID)) using a portable communication device with image capture capabilities, such as a smart phone, and send pertinent data securely to a service provider's server. Device Identification and Location Service may include collector logic for scanning the SNs and sending SNs to the service provider's server. Such information is useful for matching intellectual capital information.

Device Identification and Location Service may also correlate collected information with WiFi access points or GPS located locations, for example. This service may also send the correlation results securely to a customer's or service provider's server. Exact street address may be obtained by utilizing an access point or GPS located location.

Contract Matching and SLA may include access to any agreement related information, such as service level agreement information and logic. The service level agreement logic may include reporting features, for example. Reporting features may include an ability to report contract related information per device or per network. Also reporting may be by a specific contract, contract type, contract status (e.g., active contract), contract end date, and renewal options. Based on a scanned or entered SN (e.g., by voice or data entry on a smart phone), which may be validated using a SN service. User identification may be used to entitle a user via entitlement logic. Where a user is entitled, for example, the user may have access to contract related information. In using the entitlement logic, users may be required to be entitled before sharing any contract related information. Also, entitlement may be validated via an identification and password, for example. In some versions, a validated SN may be shared without entitlement. Mobile Communities may include mobile social networking logic that at least provides social networking for individuals with similar interests to communicate with one another through their mobile device, such as a cell phone or tablet computer. Mobile social network logic may include and take advantage of wireless network technologies including short message service (SMS), wireless application protocol, JAVA, Binary Runtime Environment for Wireless (BREW), and other mobile internet services. Mobile social network logic may also include on wireless network technologies and functionalities that have been extended to multimedia and satellite navigation including camera technologies and GPS integrated in mobile devices. Also included may be Web 2.0 and Web 3.0 technologies related to mobile social networks that interact with cloud computing logic, user-generated content (UGC), location-based services (LBS), and augmented reality (AR).

Partner/CCIE Identification Service may include expert information and services for network support and administration, including information on networks of particular providers, such as Cisco Certified Internetwork Experts and/or experts of partner technologies and network technologies in general. Such information may be per technology or per location, for example.

Smart Monitoring and Interaction may include personalize self-help logic, and mobile related services for enhancing Mobile SR Management, for example. Functionally, such logic may allow customers or partners to view, track, or update SRs and device hardware or software updates.

Mobile RMA may include logic for authorizing and tracking returns, replacements, repairs, and receipts of network components via mobile technologies.

Mobile Product Alert may include summaries and notifications of termination of service, termination of service support, bugs or viruses, other security alerts, and field notices from service provider support staff.

Mobile Intellectual Capital Application may include features that allow users to enter or update intellectual capital rules.

Logic of the Internet 304 may include logic for a decentralized global network of networks, including logic for LANs, WANs, wireless networks, or public networks that allow signal packets to be communicated between network nodes of the foregoing networks. A signal packet communicated via the Internet may be routed via a path of gateways, servers, or routers that may route the signal packet in accordance with a target address and availability of a network path to the target address.

The DMZ logic 306 may include perimeter-networking logic that may include and expose elements of the vendor service logic 310 to a larger untrusted network and logic of the larger untrusted network, such as the Internet and its logic 304. The purpose of DMZ logic is to add an additional layer of security to a network hosting the vendor service logic 310. For example, attackers external to the network hosting the vendor service logic 310 only have access to equipment and software of the DMZ logic, rather than any other part of the network.

The service application logic 313 may be hosted by a client device or a server of an entity such as the vendor (also referred to as service provider) providing the NMS. The service application logic 313 may include service level contract information and logic, operations and business logic (including manufacturing logic), and alerts for various network operational conditions, including alerts pertaining to security breaches, over use, and network and nodal operational failures, for example. The service application logic 313 may also include a contract management application for managing service level agreements (SLA). Input to the contract management application may include a device SN or PID, which may be scanned, typed, or spoken into a mobile device, for example. Output of the contract management application may include a validated SN and a contract identification number if the device subject to a contract, for example. Also, where the device is subject to a contract, the output may include contract status, last day of support, contract type, and relevant contact information, for example.

Figure 4:
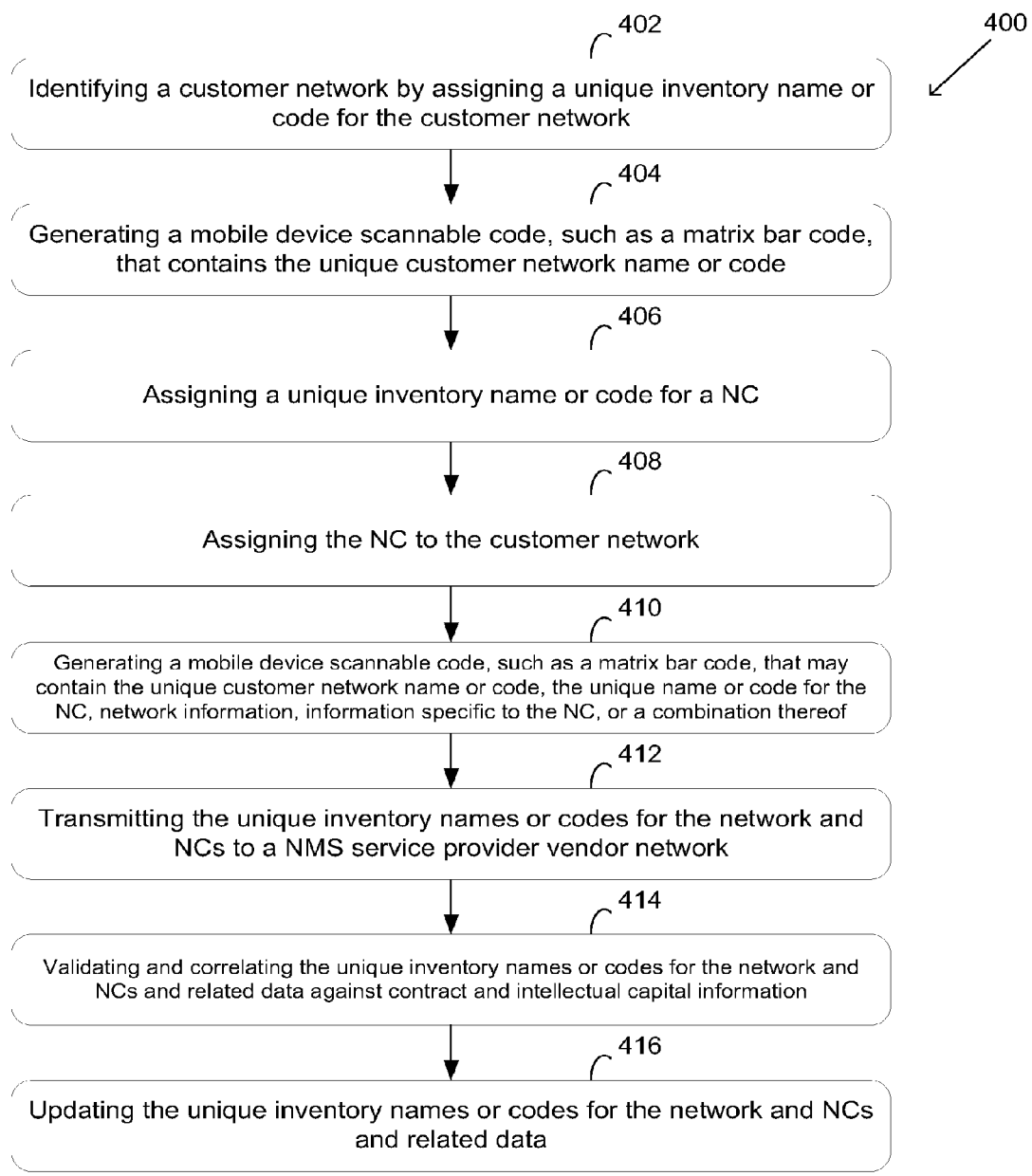
FIG. 4 illustrates a flow chart of an example method for network inventory management performed by the electronic device of FIG. 2.

FIG. 4 illustrates a flow chart of an example method 400 for inventory management performed by the electronic device of FIG. 2, in accordance with certain exemplary embodiments. The processor 202, for example, may perform the method 400 by executing processing device readable instructions encoded in the memory 204. The device readable instructions encoded in the memory 204 may include some or all of the logic described above and depicted in FIG. 2.

The method 400 starts with a first network inventory management aspect of an NMS, such as a client device, identifying a customer network by assigning or discovering a unique inventory name or code for the customer network at 402. At 404, a second network inventory management aspect of an NMS, such as a customer server and/or a vendor server of an NMS, may generate a mobile device scannable code, such as a matrix bar code, that includes the unique customer network name or code. The scannable code may also include information pertaining to the customer network, such as an amount of NCs in the network and the date of initiating the network. The scannable code may also include inventory collection information, which may include, for example, inventory for a particular year, month, week, or date. The scannable code may be outputted by an output device, such as printed out by a network printer or displayed by a display device, so that it can be posted in a data center of the network or on an NC of the network.

At 406, the second network inventory management aspect may assign a unique inventory name or code for a NC, and at 408, the second network inventory management aspect may assign the NC to the customer network. At 410, the second network inventory management aspect may generate a scannable code, such as a matrix bar code, that may contain the unique customer network name or code, the unique name or code for the NC, network information, information specific to the NC, or a combination thereof. The scannable code for the NC then may be outputted by an output device, such as printed out by a printer, so that it can be posted on an NC of the network. The NC's scannable code may also be outputted from a display device, an audio output device, or the like, upon request.

For NCs that already have a unique scannable code, the first network inventory management aspect may assign the NC to the customer network by at least scanning the unique scannable code of the NC. The first network inventory management aspect may also assign the NC to the customer network by at least scanning the unique scannable code of the NC and then receiving input including the network name or code of the network. For example, the NC can be assigned by scanning the unique scannable code of the NC via an optical sensor of a mobile device, and then scanning the unique scannable code of the network via the optical sensor of the device, receiving the network code via a keypad of the device, or receiving the network code via a microphone of the device. Also, instead of receiving the NC's identification code via a scan by the optical sensor of the mobile device, the code may be received via the keypad or microphone of the mobile device. The scanning and other forms of entering codes may occur via an optical sensor, keypad, microphone, and/or the like of the input/output 206 illustrated in FIG. 2. An advantage of using a mobile device for scanning or entering the unique scannable code is that location of the NC can be automatically determined via a GPS component of the mobile device. With respect to the locations of the codes, the unique scannable code of the network may be on a network switch chassis, and the unique scannable code of the NC may be on a card of the chassis, for example.

Instead of or in addition to processes 406 through 410, NCs may be discovered via any other form of NC discovery. Discovery of an NC and collection of information pertaining to the NC may include performing such tasks via a command line interface, for example. In such as case, running a command line interface command, such as "config", may lead to discovery of an NC. Typically when running "config", output may include a list of cards for a given chassis, router, or switch, for example. Also, discovery of an NC may come through searching management information bases (MIBs) via SNMP, for example. Further, a collector (typically software) may collect data on a customer network or on components of that network on a periodic basis. Once collected the data may be transmitted securely to storage logic of service provider network. A collector may be configured to discover NCs that it collects information on or it may be given identifiers of the NCs (e.g., IP addresses), so discovery may not be necessary.

At 412, a transmitter of the first network inventory management aspect, for example, may transmit the unique inventory names or codes for the network and NCs to a NMS service provider vendor network, such as vendor LAN/WAN 120. Also, the transmitter, for example, may transmit network and specific NC information to the vendor LAN/WAN 120. The communications of this information may be transmitted over a secure transport mechanism, such as using the DMZ logic 306, which may include encryption. At 414, the unique inventory names or codes for the network and NCs and related data may be validated and correlated, via the second network inventory management aspect, to contract and intellectual capital information, stored in the service application logic 313, for example. Further, the validation and correlation may be performed by an aspect of the service application logic 313. Prior to validation and correlation, in cases where a collector or mobile device outside of a network collects the NCs and related data, such a collector or mobile device may be need to be authenticated by a security technology to ensure the collector or mobile device is authorized by the network. Also, a user prior to using the collector or mobile device for such functionality may also need to be authenticated by the security technology.

Finally, at 416, the second network inventory management aspect may update the unique inventory names or codes for the network and NCs and related data that was transmitted to the vendor LAN/WAN 120. Related data may include data generated from one of the various components of the client application logic 302 or the service application logic 313. At 418, such data updated in the vendor service logic 310 may be reported back to the customer LAN/WAN 105 via the second network inventory management aspect, and then in turn be received by a mobile device connected to the customer LAN/WAN. This information reported to the customer LAN/WAN 105 may include alerts and notifications regarding operating conditions and various status information of the customer network or an NC of the network. The information may include contract coverage, administrative support information, security issues, and bugs, for example. The information may also include data related to Mobile Network Analytic, License Coverage, Mobile SR Management, Device Identification and Location Service, Contract Matching and SLA, Mobile Communities, Partner/CCIE Identification Service, Smart Monitoring and Interaction, Mobile RMA, Mobile Product Alert, and Mobile IC Application, for example.

By integrating a mobile device with a NMS (e.g., the NMS 100), the benefit of this last process at 418 may be available from anywhere that the mobile device can receive telecommunications service. Besides, being able to interact with an NMS from any location having telecommunications service, by integrating mobile technology, the NMS becomes location aware via a GPS component of the mobile technology. Further, the portability of mobile device allows on-site diagnosis of NCs and progress tracking of shipped NCs, with respect to location and repair status, for example. As suggested the benefits of integrating mobile device technology with an NMS is endless.

Figure 5:
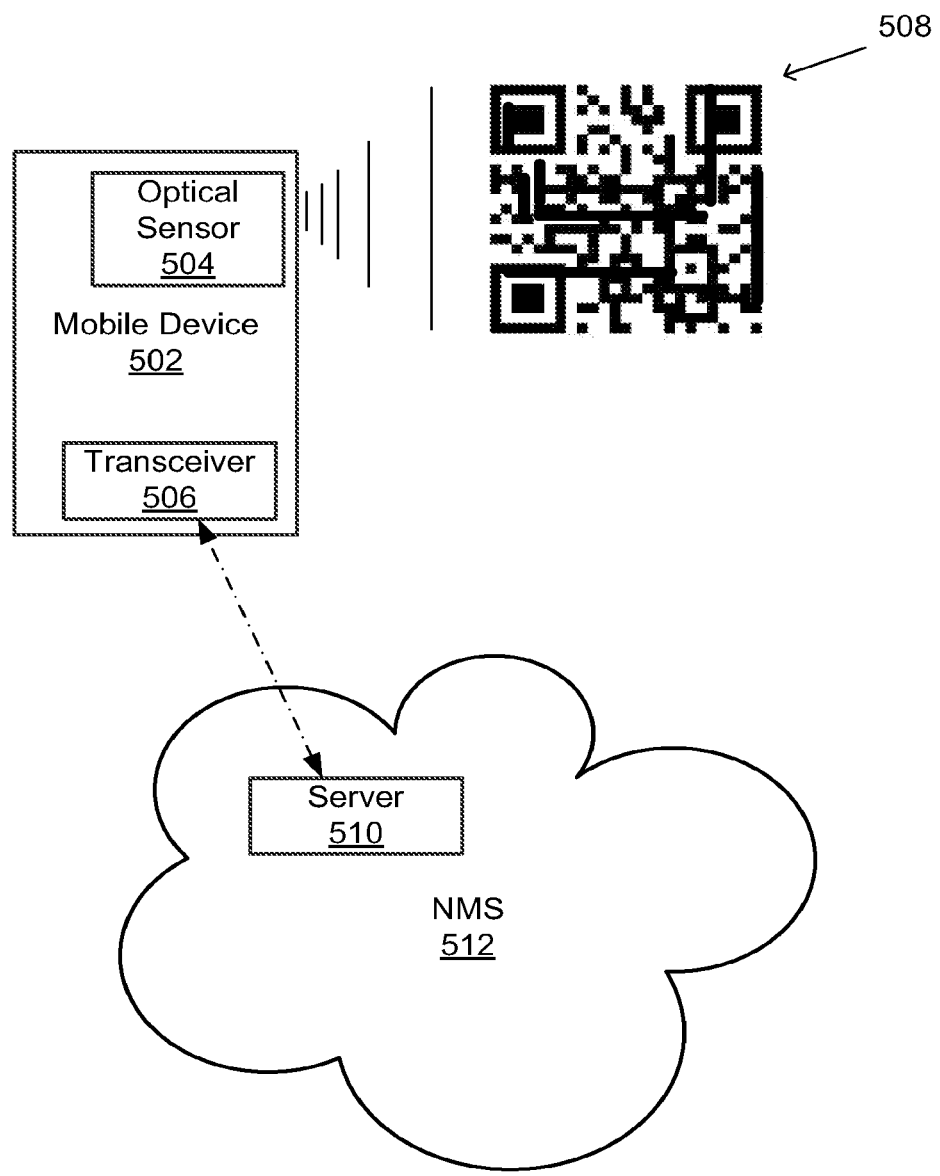
FIG. 5 illustrates an example mobile device scanning an example NC code and communicating the code to an example server of an example NMS.

FIG. 5 illustrates an example mobile device 502 scanning an example NC code 508 and communicating the code 508 to an example server 510 of an example NMS 512, in accordance with certain exemplary embodiments. For example, the mobile device 502 can scan the code 508 via an optical sensor 504 (e.g., a digital camera) and communicate the code 508 via a transceiver 506 of the device 200, in certain exemplary embodiments. As illustrated in FIG. 5, the example bar code may include a matrix bar code. A person of ordinary skill in the art will recognize that the code 508 can include different or other elements (which may or may not include matrix bar codes) in alternative exemplary embodiments. The server 510 may communicate information pertaining to a respective NC associated with the NC code 508 to the mobile device 502, which may be received by the transceiver 506. In certain alternative exemplary embodiments, the mobile device 502 may also be an aspect of the NMS 512.

Various embodiments described herein can be used alone or in combination with one another. The foregoing detailed description has described only a few of the many possible implementations of the present embodiments. For this reason, this detailed description is intended by way of illustration, and not by way of limitation.

What is claimed is:
1. A method, comprising:
    receiving, at a mobile device, an input of a code associated with an electronic component;
    determining, by the mobile device, whether the electronic component is a component of a network, based on comparing the code against inventory data associated with the network;
    assigning the electronic component to the network, in response to determining that the electronic component is not a network component of the network; and
    receiving a notification regarding operating conditions of the electronic component with respect to the network.
2. The method of claim 1, wherein the input of the code includes audio information representative of the code.

3. The method of claim 1, wherein the input of the code includes graphical information representative of the code.

4. The method of claim 1, wherein the receiving of the input of the code includes receiving a voice command including the code.

5. The method of claim 1, wherein the receiving of the input of the code includes receiving a photographed image including the code.

6. The method of claim 1, wherein the receiving of the input of the code includes receiving a scanned image including the code.

7. The method of claim 1, wherein the assigning comprises identifying the electronic component as a component of the network by the code and logically linking the electronic component to the network.

8. The method of claim 1, further comprising:
   requesting at least one of operational parameters or characteristics of the electronic component, by the mobile device.

9. The method of claim 1, further comprising: assigning at least one of operational parameters or characteristics of the electronic component, by the mobile device.

10. A system comprising:
    a processing device configured to:
        read an inputted code associated with an electronic component, the electronic component being one or more of a software component or hardware component, the inputted code derived from a voice command;
        determine whether the electronic component is a network component of a network, based on the inputted code;
        assign the electronic component to the network, in response to determining that the electronic component is not a network component of the network; and
        receive a notification regarding operating conditions of the electronic component with respect to the network.

11. The system of claim 10, wherein the processing device is further configured to:
    validate the inputted code against service level agreement information.

12. The system of claim 10, wherein the processing device is further configured to:
    validate the inputted code against intellectual capital information.

13. The system of claim 10, wherein the processing device is further configured to:
    validate the inputted code against social media information.

14. A non-transitory memory device having stored thereon processor executable instructions that, in response to execution by a processor, cause the processor to perform operations comprising:
    identifying an electronic component;
    assigning the electronic component to a network, in response to determining that the electronic component is not a network component of the network;
    assigning a network code associated with the network to the electronic component;
    assigning a unique inventory code to the electronic component;
    generating a graphic corresponding to the network code and the unique inventory code; and
    receiving a notification regarding operating conditions of the electronic component with respect to the network.

15. The non-transitory memory device of claim 14, wherein the executable instructions, in response to execution by a processor, cause the processor to perform operations comprising:
    associating the network code and the unique inventory code with contract and intellectual capital information.

16. The non-transitory memory device of claim 14, wherein the executable instructions, in response to execution by a processor, cause the processor to perform operations further comprising:
    associating the graphic with inventory data associated with the network.

17. The non-transitory memory device of claim 14, wherein the graphic includes text corresponding to the network code and the unique inventory code.

18. The non-transitory memory device of claim 14, wherein the graphic includes a barcode corresponding to the network code and the unique inventory code.

* * * * *